United States Patent
Lape et al.

(10) Patent No.: US 8,125,114 B2
(45) Date of Patent: Feb. 28, 2012

(54) DYNAMOELECTRIC MACHINE LOCKING WEDGE FOR MAINTAINING A WINDING IN A SLOT

(75) Inventors: Brock M. Lape, Clifton Park, NY (US); Benjamin A. Mancuso, Schenectady, NY (US); Michael C. Villani, Rensselaer, NY (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 12/624,889

(22) Filed: Nov. 24, 2009

(65) Prior Publication Data

US 2011/0121678 A1 May 26, 2011

(51) Int. Cl.
*H02K 3/48* (2006.01)
*H02K 3/34* (2006.01)
*H02K 1/06* (2006.01)

(52) U.S. Cl. .............. 310/214; 310/215; 310/216.069; 310/216.071

(58) Field of Classification Search .......... 310/214, 310/215, 216.069, 216.071
See application file for complete search history.

(56) References Cited

U.S. PATENT DOCUMENTS

| | | | |
|---|---|---|---|
| 1,723,409 A * | 8/1929 | Cogneau ..................... | 310/61 |
| 3,740,601 A | 6/1973 | Amasino et al. | |
| 3,778,891 A | 12/1973 | Amasino et al. | |
| 3,909,931 A | 10/1975 | Lambrecth | |
| 4,015,156 A | 3/1977 | Johrde | |
| 4,091,528 A * | 5/1978 | Khutoretsky et al. ........ | 29/596 |
| 4,149,101 A | 4/1979 | Lesokhin et al. | |
| 4,184,091 A | 1/1980 | Khutoretsky et al. | |
| 4,469,971 A * | 9/1984 | Moore ........................ | 310/214 |
| 5,048,177 A * | 9/1991 | Keck et al. .................. | 29/734 |
| 6,124,659 A | 9/2000 | Rowe et al. | |
| 6,218,759 B1 | 4/2001 | Blakelock et al. | |
| 6,294,855 B1 | 9/2001 | Kelleher | |
| 6,331,745 B2 | 12/2001 | Blakelock et al. | |
| 7,154,205 B2 | 12/2006 | Yung et al. | |
| 2009/0045692 A1 * | 2/2009 | Rozier et al. ................. | 310/214 |

FOREIGN PATENT DOCUMENTS

| | | |
|---|---|---|
| GB | 1574746 A | 9/1980 |
| JP | 56166739 A | 12/1981 |

OTHER PUBLICATIONS

Search Report from corresponding GB Application No. GB1019333.2 dated Mar. 11, 2011.

\* cited by examiner

*Primary Examiner* — Quyen Leung
*Assistant Examiner* — Jose Gonzalez Quinones
(74) *Attorney, Agent, or Firm* — James W. Pemrick; Ernest G. Cusick; Frank A. Landgraff

(57) ABSTRACT

A locking wedge for a slot of a dynamoelectric machine is provided. The locking wedge includes a main body extending in an axial direction. The main body has a top surface and a bottom surface with a greater surface area than the top surface, and a first end surface and a second end surface opposed to the first end surface. First and second locking slots extend in the axial direction into a portion of the main body. The first locking slot begins in the first end surface and the second locking slot begins in the second end surface. A first locking member is disposed to fit into the first locking slot, and a second locking member is disposed to fit into the second locking slot. The first and second locking members can be inserted into the first and second locking slots, respectively, to lock the locking wedge in the slot.

20 Claims, 6 Drawing Sheets

DYNAMOELECTRIC MACHINE LOCKING WEDGE FOR MAINTAINING A WINDING IN A SLOT

CROSS-REFERENCE TO RELATED APPLICATIONS

This application is related to application Ser. No. 12/607,385, filed on Oct. 28, 2009 and titled "Locking Wedge For Maintaining A Winding In A Slot And Dynamoelectric Machine incorporating Same".

BACKGROUND OF THE INVENTION

This invention relates generally to dynamoelectric machines and more particularly, to a locking wedge for maintaining a winding in a slot of a dynamoelectric machine.

Armature windings, also known as stator bar or rotor windings, are routinely inspected in at least some known electrical power generators, to verify their operation. In some known generators, a stator yoke in the generator surrounds an armature core and partially encloses the armature windings. The armature windings are formed from a plurality of copper conductors that are wound in the armature to form loops. The armature windings may be arranged within a stator slot in such a manner that desired voltage and current characteristics may be maintained by the generator during operation.

At least one known generator includes a wedge system to induce a radial retaining force (RRF) to the stator from wedges to facilitate reducing movement of the stator bar windings within the stator slot. The wedge system typically includes various filler strips disposed above and/or below the windings and a series of wedges located at the top of the slot. However, if the wedge system itself becomes loose, the amount of RRF is reduced such that the stator bar windings may move during operation. Accordingly, locking wedges have been used at the axial ends of the stator core to retain a series of interposed body wedges within a groove in the stator slot. However, known locking wedges are difficult to remove without sustaining damage during the removal process.

BRIEF DESCRIPTION OF THE INVENTION

In one aspect of the invention, a locking wedge is provided for a slot of a dynamoelectric machine. The locking wedge includes a main body extending in an axial direction. The main body has a top surface and a bottom surface with a greater surface area than the top surface, and a first end surface and a second end surface opposed to the first end surface. First and second locking slots extend in the axial direction into a portion of the main body. The first locking slot begins in the first end surface and the second locking slot begins in the second end surface. A first locking member is disposed to fit into the first locking slot, and a second locking member is disposed to fit into the second locking slot. The first and second locking members can be inserted into the first and second locking slots, respectively, to lock the locking wedge in the slot.

In another aspect of the invention, a locking wedge is provided for a slot in a dynamoelectric machine. The dynamoelectric machine includes a core having a slot extending in an axial direction. The locking wedge has a wedge body extending in an axial direction, a top surface and a bottom surface having a greater surface area than the top surface, and a first end surface and a second end surface opposed to the first end surface. A first locking slot is disposed in at least a portion of the wedge body, and begins in the first end surface and extends in an axial direction. A second locking slot is disposed in at least a portion of the wedge body, and begins in the second end surface and extends in an axial direction. At least one locking member is configured to engage at least one of the first and second locking slots.

In a further aspect of the present invention, a dynamoelectric machine is provided having a core with at least one slot extending in an axial direction. The dynamoelectric machine includes at least one locking wedge having a wedge body extending in an axial direction. The wedge body has a top surface and a bottom surface having a greater surface area than the top surface, and first and second end surfaces, where the second end surface is opposed to the first end surface. A first locking slot is disposed in at least a portion of the wedge body, and begins in the first end surface and extends in an axial direction. A second locking slot is disposed in at least a portion of the wedge body, and begins in the second end surface and extends in an axial direction. A first locking member is disposed to fit into said the locking slot; and a second locking member is disposed to fit into the second locking slot.

DETAILED DESCRIPTION OF THE INVENTION

A dynamoelectric machine is defined as any apparatus that converts electrical energy between the electrical and the mechanical state by means of an electromagnetic effect. As non-limiting examples, a dynamoelectric machine may include motors and/or generators. Windings are employed in the armature and field of a dynamoelectric machine, and may be held in place by a retaining system incorporating various components (e.g., wedges, ripple springs, etc.).

Figure 1:
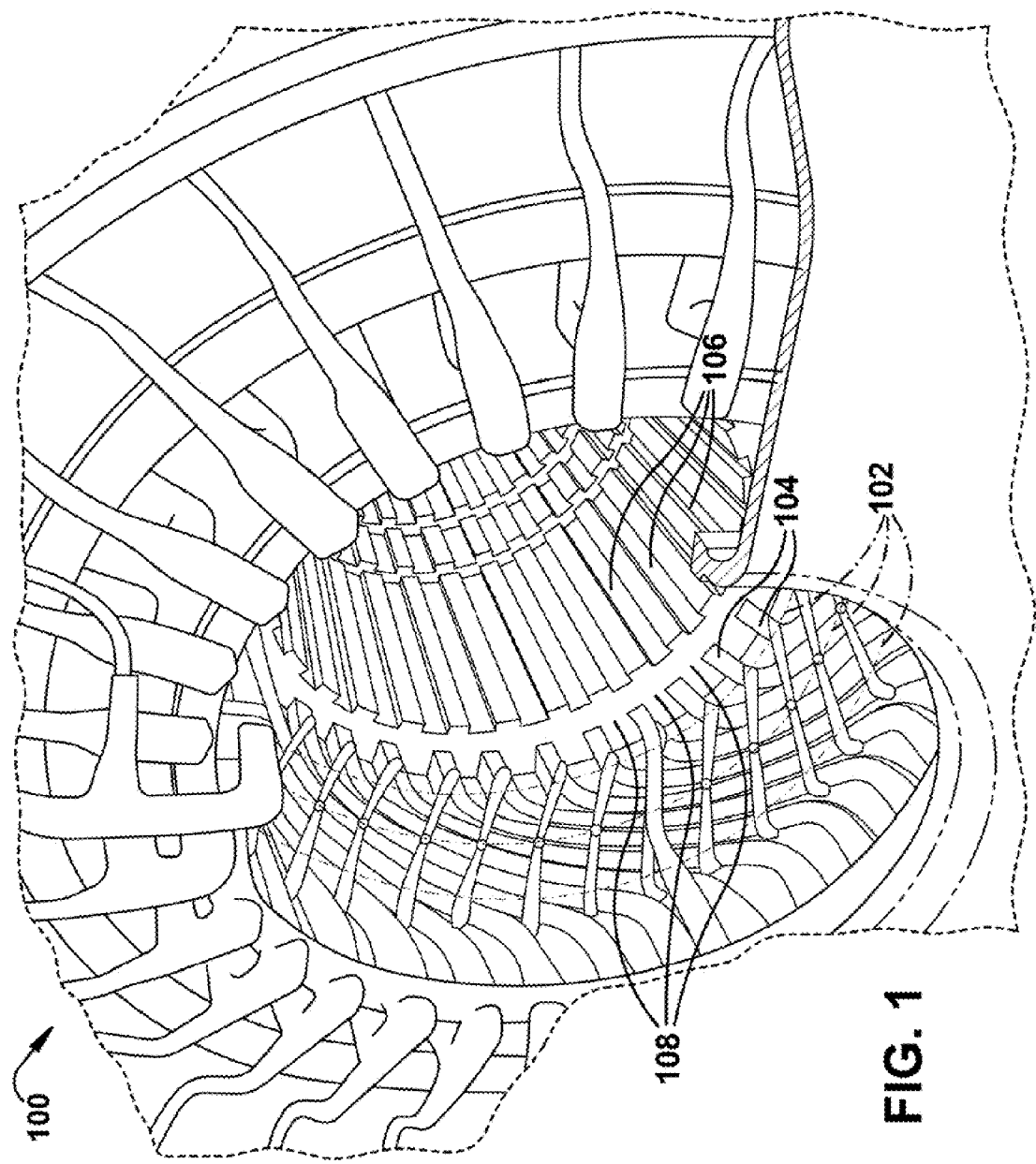
FIG. 1 is a perspective end illustration of an exemplary electric generator.

FIG. 1 is a perspective end view of an exemplary electric generator 100. A rotor 102 is transparently represented by dashed lines. A plurality of stator bar windings 104 are positioned in slots 106 defined around an inner circumference of a stator core 108. In the exemplary embodiment, stator bar windings 104 are formed from a plurality of flat bar conductors or stator bars that are coupled together to form a predetermined winding path through winding 104. In one embodiment, the stator bars are fabricated from copper.

Figure 2:
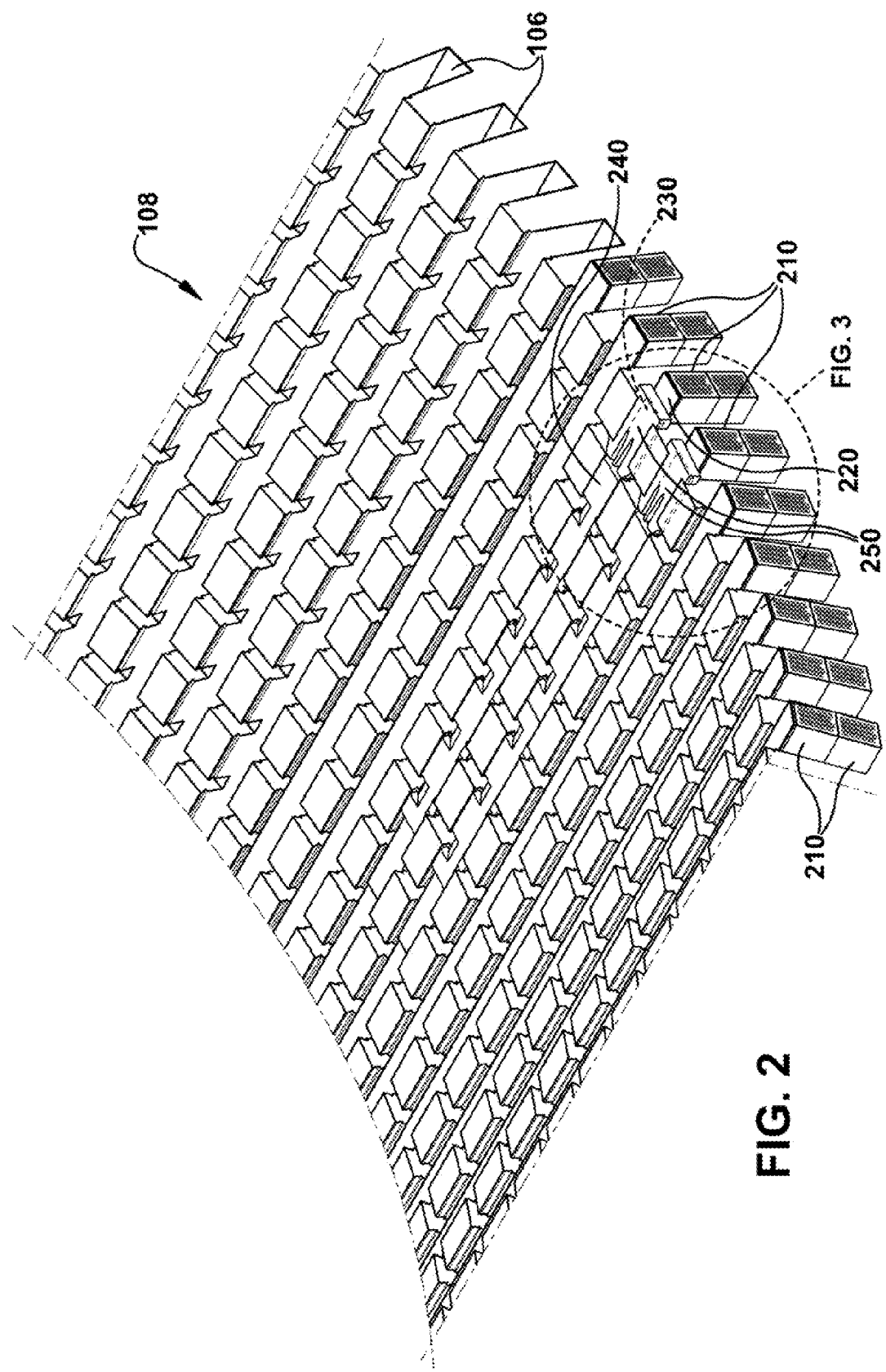
FIG. 2 is a partial isometric illustration of a portion of the stator core in the electric generator stator shown in FIG. 1.

FIG. 2 illustrates a partial, perspective illustration of a stator core 108. The stator core 108 has a plurality of slots 106, generally extending in an axial direction, which contain the windings 210. As one example, two windings 210 may be contained within each slot 106. The windings 210 are housed in the lower portion of the slots 106. Various filler strips 220, slides 230, body wedges 240 and end wedges 250 may be installed above the windings 210.

Figure 3:
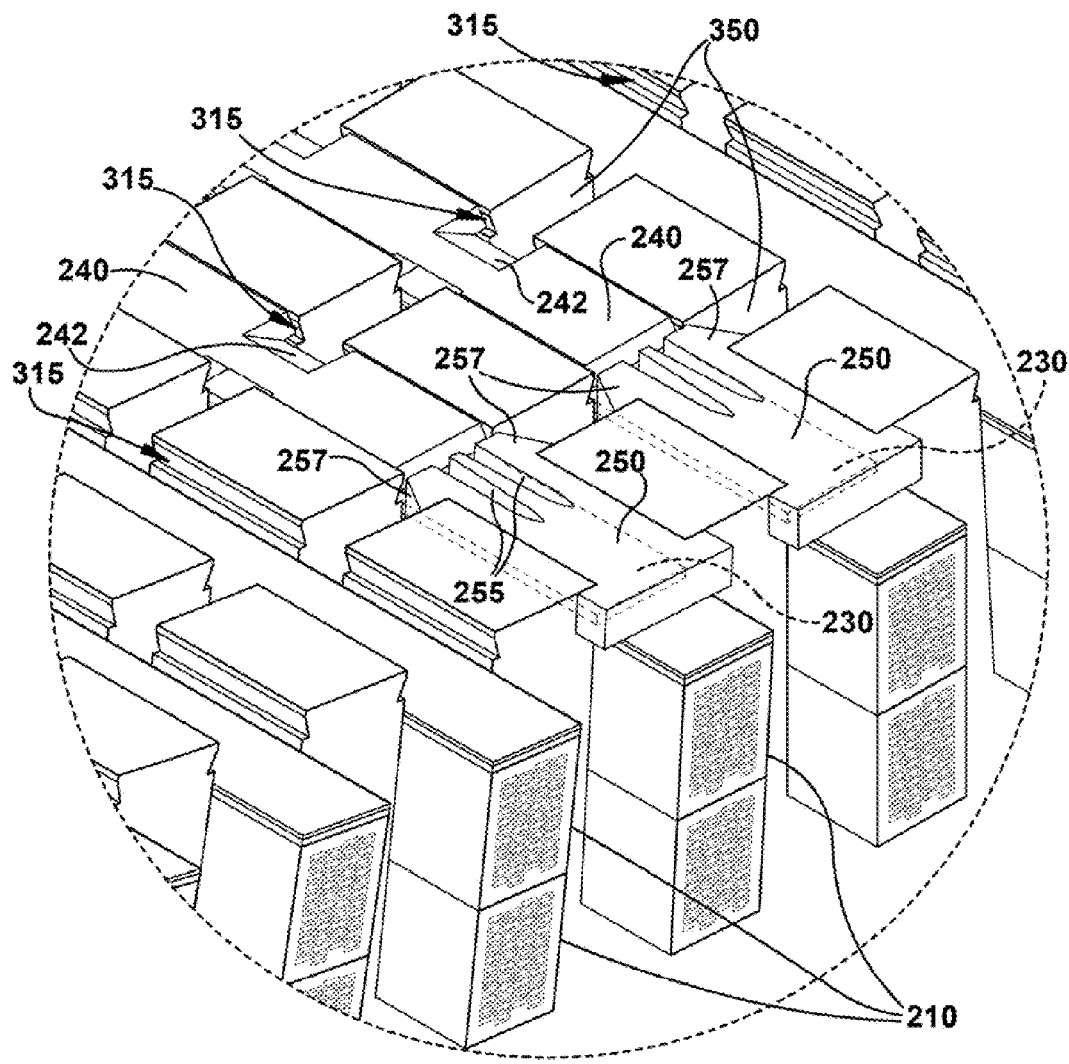
FIG. 3 is an enlarged partial isometric illustration of a portion of the stator core shown in FIG. 2.

FIG. 3 is an enlarged, partial perspective illustration of a stator core, and shows the interrelation between the slots 106, slides 230, body wedges 240 and locking wedges 250. The dovetail shaped wedge 240 engages a dovetail groove 315 and a slide 230 is normally driven under the wedge 240. The stator core 108 may be comprised of many laminations of magnetic steel or iron material. The laminations form groups, and these groups are separated by spacers. The spacers define cooling vent slots 350, which are generally orthogonal to the slots 106. The cooling vents 350 between the groups of laminations allow for ventilation and cooling of the stator core. Typically, the vent gaps 242 in the wedges 240 are aligned with the cooling vents 350.

The locking wedge 250 has a plurality of channels or cuts 255. These cuts 255 allow the angled end portions 257 to compress inward during installation as the locking wedge 250 is axially inserted through dovetail groove 315. Once the angled end portions 257 extend past the first cooling vent they snap into place and lock the wedge in position. The cuts 255 face in an axially-inward direction, towards the center of the slot or core. A disadvantage to this design is that the cuts 255 remain un-secured and the possibility exists that the locking wedge 250 could work loose or become damaged.

Figure 4:
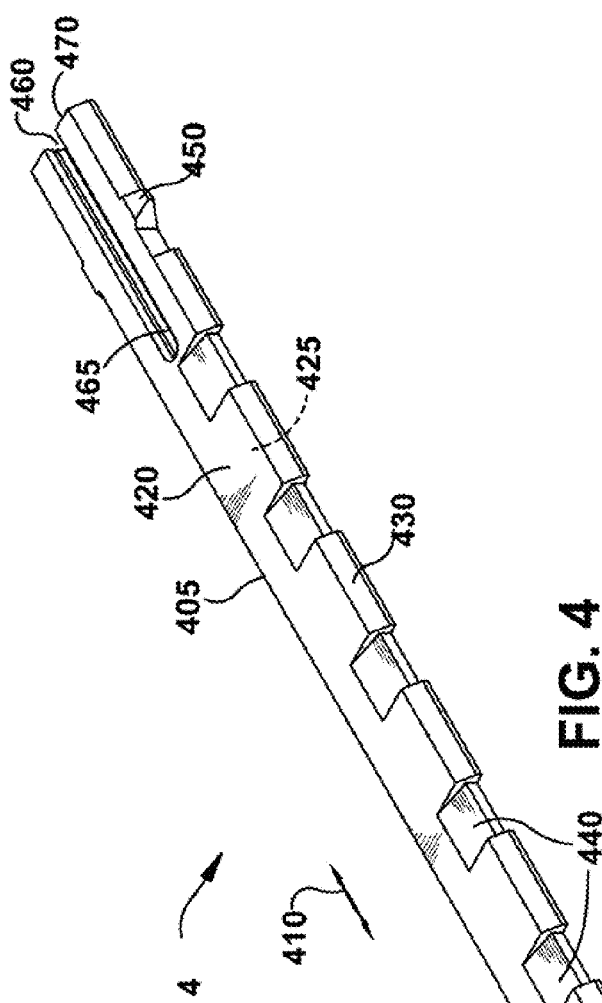
FIG. 4 is an isometric illustration of a locking end wedge, according to an aspect of the present invention.

FIG. 4 illustrates an isometric view of an improved locking wedge 400, according to aspects of the present invention. The locking wedge 400 has a main body 405 that extends in an axial direction 410. The wedge has a top surface 420 and a bottom surface 425. The bottom surface 425 may have a larger surface area than top surface 420. In this variation, the sides 430 of the locking wedge may have angled surfaces. A first end surface 470 faces in an axially-inward direction and a second end surface 475 faces in an axially-outward direction. The locking wedge may also include angled vent gaps 440 which can be aligned with the cooling vents 350 in the core if desired.

A projection 450 may be included in one or both sides of the wedge and can be used to lock or snap into a cooling vent slot 350. Locking slots 460 are axially disposed in at least a portion of the wedge body 420. The locking slot 460 may also include a pair of axial oriented grooves 465 formed in the sides thereof. In one embodiment, the locking slot 460 may extend into about one quarter to about one half or more of the length of the wedge 400. Alternatively, the locking slots 460 may have different lengths, and/or may have any length as desired for the specific application. A first locking slot 460 is preferably disposed in the axially-outward direction when the locking wedge is installed in the slot 106, and a second locking slot, opposed to the first locking slot, is disposed in an axially-inward direction. As can be seen in FIG. 4, two locking slots 460 are located at each end of wedge 400. The locking slots 460 gives the portions of the wedge on either side of the locking slot flexibility so that they may flex inward during insertion of the wedge 400 into dovetail groove 315.

Figure 5:
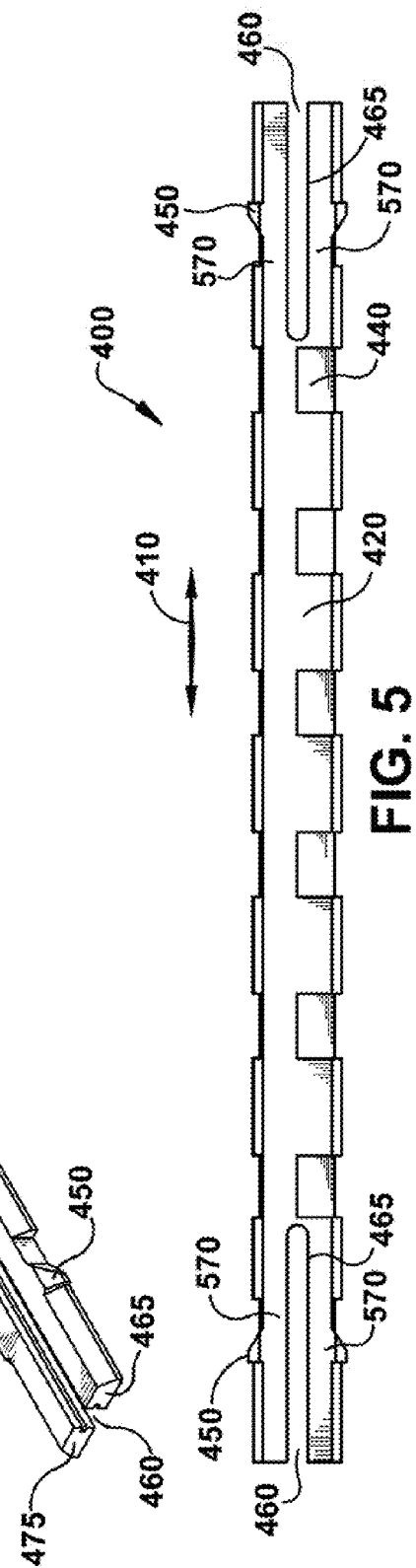
FIG. 5 is a top plan illustration of the locking end wedge of FIG. 4.

FIG. 5 illustrates a top view of wedge 400. The locking slots 460 extend in the axial direction and include a groove 465 on both sides thereof. The locking slot can extend past projections 450 and enable the side portions 570 to flex inward during installation of the locking wedge 400.

Figure 6:
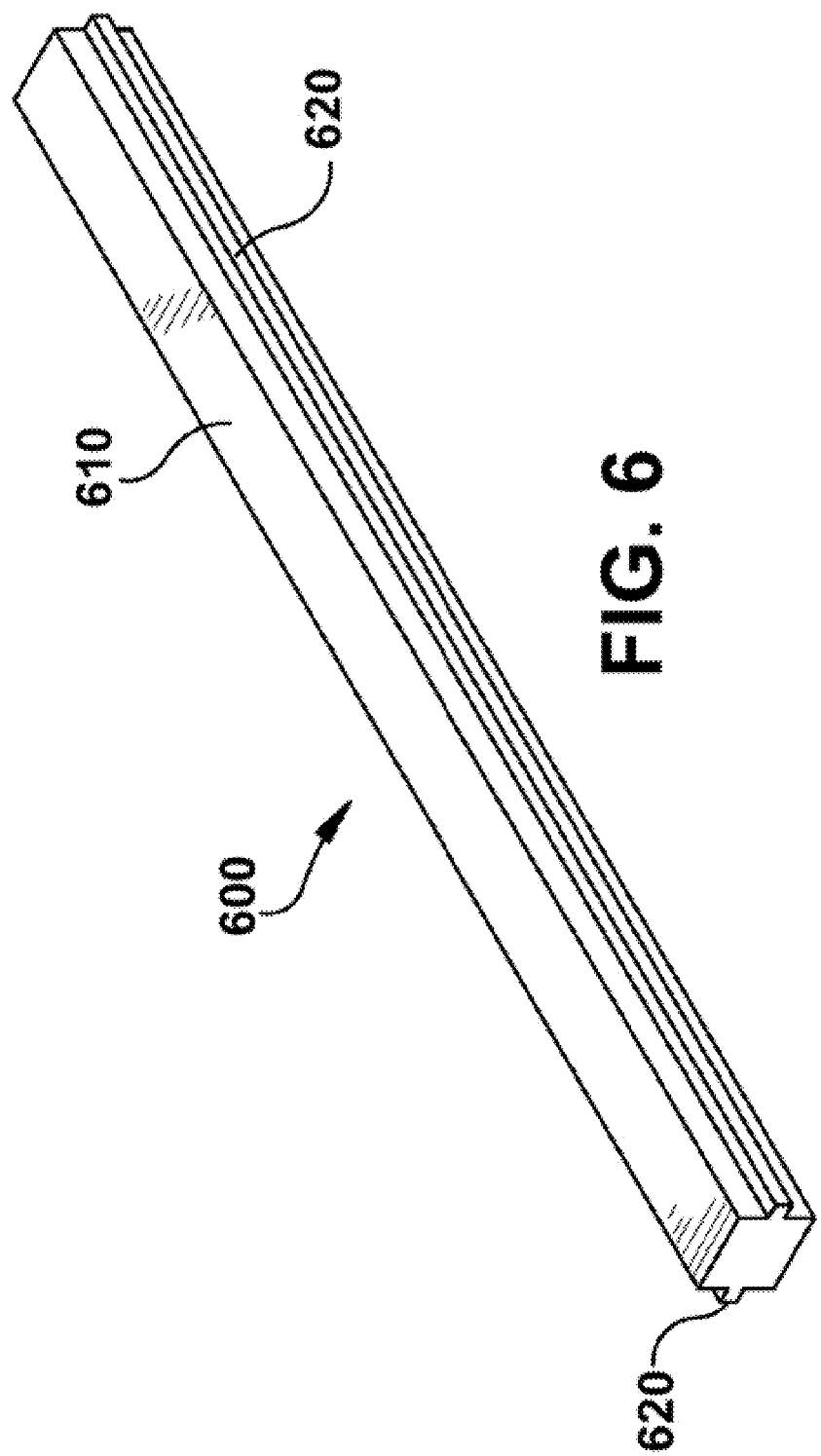
FIG. 6 is an isometric illustration of a locking member that can be used with the locking end wedge of FIG. 4, according to an aspect of the present invention.

FIG. 6 illustrates an isometric view of a locking member 600 that is configured to fit into locking slot 460. The locking member 600 includes a main body 610 and side rails 620, both of which extend in an axial direction. The side rails 620 are configured to fit into the grooves 465 of the locking slot 460. Once the locking wedge 400 is inserted into the dovetail groove 315, the locking member 600 can be inserted into locking slot 460, according to one aspect of the present invention. In another aspect, the locking member 600 may be inserted into locking slot 460 before wedge 400 is inserted into dovetail groove 315. The locking member 600 locks the locking wedge into slot 106 and dovetail groove 315 by preventing the side portions 570 from flexing inward.

Figure 7:
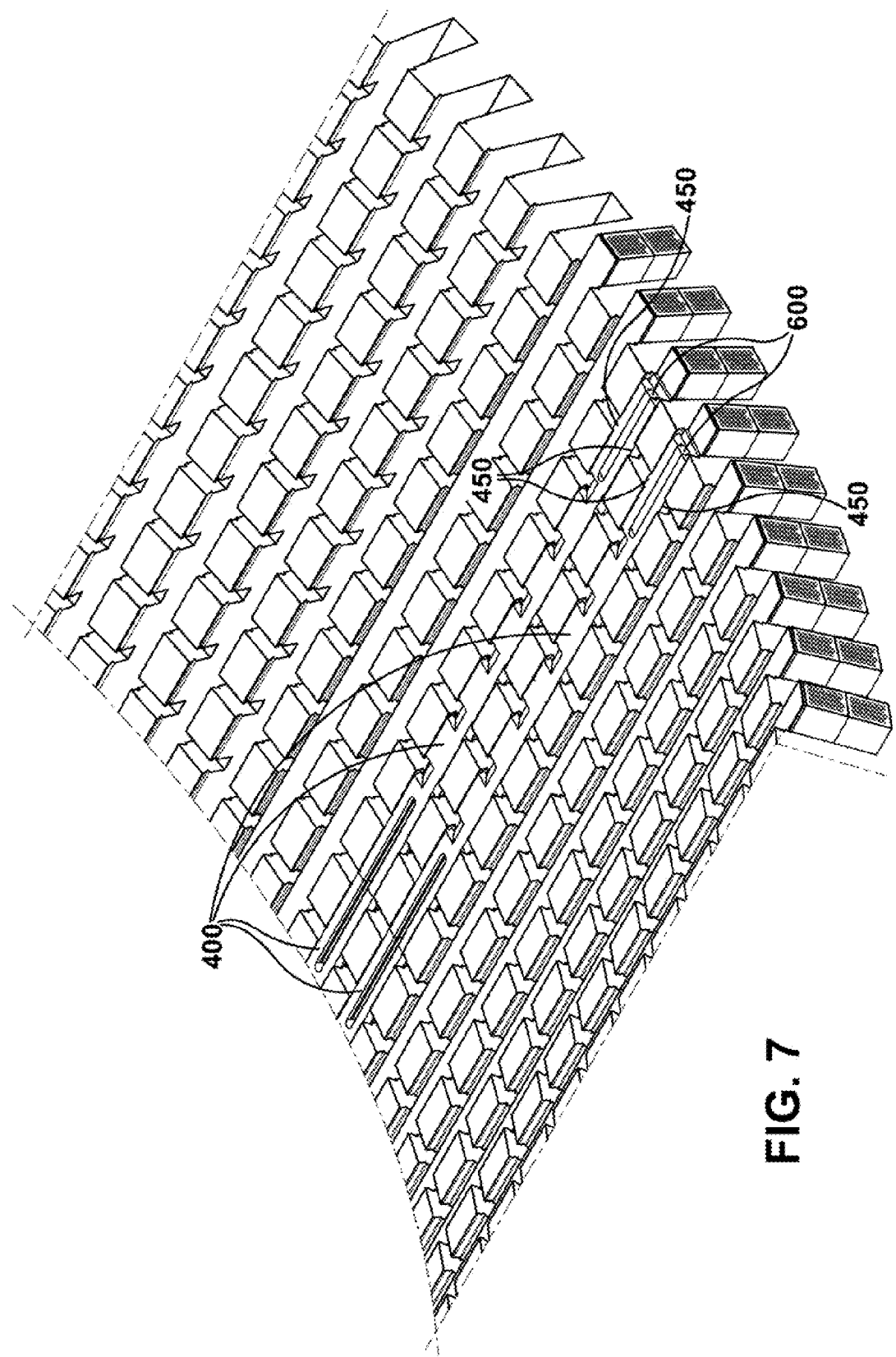
FIG. 7 is a partial isometric illustration of a portion of the stator core in the electric generator stator shown in FIG. 1, according to an aspect of the present invention.

FIG. 7 illustrates a partial view of stator core 108. The locking wedges 400 can be inserted into slot 106. The locking wedge 400 has a double-ended locking mechanism (incorporating locking members 600), which enables the wedge to be locked from both ends, and enables the wedges 400 to be spaced from one another (if desired) rather than having them butted up against each other. The wedge 400 is longer than prior known wedges, and this allows fewer wedges to be used per core. One advantage of using fewer wedges is the reduction of labor and material costs. The dimensions of the wedge 400 may have any desired dimension as required in the specific application, but as non-limiting examples, wedge 400 may have a width of about one inch and a length of about 15 inches. Body wedges 240 could also be used with the present invention if desired.

The grooves 465 and rails 620 are shown with a rectangular profile, but could be designed to have any suitable shape or profile. As non-limiting examples, the groove 465 could have an arcuate, dovetail or trapezoidal shape. Accordingly, the rails 620 should be designed to have a complementary shape to fit into grooves 465 (e.g., an arcuate, dovetail or trapezoidal shape, respectively). Further, the overall cross-sectional profile of the locking slot and 460 and locking member 600 are generally rectangular, but could be configured to have any desired cross-sectional profile, including but not limited to polygonal, circular, hexagonal, trapezoidal, etc.

The locking wedge 400 and locking member 600 may be constructed of any suitable material, such as but not limited to, fiberglass, fiberglass laminates, fiberglass composites, magnetic materials, cotton phenolic, woven aramid fabrics, etc. In addition, the locking wedge 400 may have any suitable length as desired in the specific application, and as non-limiting examples, may include lengths from about one inch to about sixteen inches or more.

While the invention has been described in terms of various specific embodiments, those skilled in the art will recognize that the invention can be practiced with modification within the spirit and scope of the claims.

What is claimed is:

1. A locking wedge for a slot of a dynamoelectric machine, said locking wedge comprising:
    a main body extending in an axial direction, said main body having a top surface and a bottom surface having a greater surface area than said top surface;
    a first end surface and a second end surface opposed to said first end surface;
    a first locking slot extending in the axial direction into a portion of said main body, said first locking slot beginning in said first end surface, the first locking slot extending from the bottom surface to the top surface;
    a second locking slot extending in the axial direction into a portion of said main body, said second locking slot beginning in said second end surface, the second locking slot extending from the bottom surface to the top surface;
    a first locking member disposed to fit into said first locking slot;
    a second locking member disposed to fit into said second locking slot;

wherein said first and second locking members can be inserted into said first and second locking slots, respectively, to lock said locking wedge in said slot.

2. The locking wedge according to claim 1, further comprising:
at least one pair of projections disposed on side surfaces of said locking wedge;
wherein said at least one pair of projections engage a portion of said slot.

3. The locking wedge according to claim 1, said first and second locking slots further comprising a pair of grooves disposed on opposing surfaces thereof and extending in an axial direction.

4. The locking wedge according to claim 3, said first and second locking members further comprising a pair of rails disposed thereon, said rails for engaging said pair of grooves.

5. The locking wedge according to claim 1, wherein said locking wedge comprises a fiberglass laminate.

6. The locking wedge according to claim 1, wherein said locking wedge has a width of about one inch or greater.

7. A locking wedge for a slot in a dynamoelectric machine, said dynamoelectric machine comprising a core having a slot extending in an axial direction, said locking wedge comprising:
a wedge body extending in an axial direction, said wedge body having a top surface and a bottom surface, said bottom surface having a greater surface area than said top surface, and a first end surface and a second end surface opposed to said first end surface;
a first locking slot disposed in at least a portion of said wedge body, said first locking slot beginning in said first end surface and extending in an axial direction, the first locking slot extending from the bottom surface to the top surface;
a second locking slot disposed in at least a portion of said wedge body, said second locking slot beginning in said second end surface and extending in an axial direction, the second locking slot extending from the bottom surface to the top surface;
at least one locking member configured to engage at least one of said first locking slot and said second locking slot.

8. The locking wedge according to claim 7, wherein the locking wedge is placed in said slot and positioned so that at least one of said first locking slot or said second locking slot is towards an outer portion of said slot.

9. The locking wedge according to claim 7, said first and second locking slots further comprising a pair of grooves disposed thereon, said pair of grooves extending in the axial direction.

10. The locking wedge according to claim 9, said at least one locking member further comprising a pair of rails disposed on opposing surfaces thereof, said pair of rails for engaging said pair of grooves.

11. The locking wedge according to claim 7, wherein said locking wedge comprises a fiberglass laminate.

12. The locking wedge according to claim 7, wherein said locking wedge has a width of about one inch or greater.

13. A dynamoelectric machine comprising a core having at least one slot extending in an axial direction, said dynamoelectric machine comprising:
at least one locking wedge having a wedge body extending in an axial direction, said wedge body having a top surface and a bottom surface having a greater surface area than said top surface, and a first end surface and a second end surface opposed to said first end surface;
a first locking slot disposed in at least a portion of said wedge body, said first locking slot beginning in said first end surface and extending in an axial direction, the first locking slot extending from the bottom surface to the top surface;
a second locking slot disposed in at least a portion of said wedge body, said second locking slot beginning in said second end surface and extending in an axial direction, the second locking slot extending from the bottom surface to the top surface;
a first locking member disposed to fit into said first locking slot; and
a second locking member disposed to fit into said second locking slot.

14. The dynamoelectric machine according to claim 13, said first and second locking slots further comprising a pair of grooves disposed therein and extending in the axial direction.

15. The dynamoelectric machine according to claim 14, said first and second locking members further comprising a pair of rails disposed thereon, said pair of rails for engaging said pair of grooves.

16. The dynamoelectric machine according to claim 13, wherein said at least one locking wedge comprises a fiberglass laminate.

17. The dynamoelectric machine according to claim 13, wherein said at least one locking wedge has a length of about fifteen inches or greater.

18. The dynamoelectric machine according to claim 13, wherein said at least one locking wedge has a width of about one inch or greater.

19. The dynamoelectric machine according to claim 13, wherein said core is chosen from at least one of a stator core and a rotor core.

20. The dynamoelectric machine according to claim 13, wherein said dynamoelectric machine is chosen from at least one of a generator and a motor.

* * * * *